(12) United States Patent
McCann et al.

(10) Patent No.: US 11,301,528 B2
(45) Date of Patent: *Apr. 12, 2022

(54) SELECTING CONTENT OBJECTS FOR RECOMMENDATION BASED ON CONTENT OBJECT COLLECTIONS

(71) Applicant: Wix.com Ltd., Tel Aviv (IL)

(72) Inventors: Andrew Simz Arneson McCann, Vancouver (CA); Roger David Donaldson, Vancouver (CA); Christopher Warren Nell, Vancouver (CA)

(73) Assignee: Wix.com Ltd., Tel Aviv (IL)

( * ) Notice: Subject to any disclaimer, the term of this patent is extended or adjusted under 35 U.S.C. 154(b) by 142 days.

This patent is subject to a terminal disclaimer.

(21) Appl. No.: 16/571,219

(22) Filed: Sep. 16, 2019

(65) Prior Publication Data

US 2020/0012698 A1 Jan. 9, 2020

Related U.S. Application Data

(63) Continuation of application No. 15/376,666, filed on Dec. 13, 2016, now Pat. No. 10,417,294, which is a
(Continued)

(51) Int. Cl.
*G06F 16/00* (2019.01)
*G06F 16/9535* (2019.01)
(Continued)

(52) U.S. Cl.
CPC ...... *G06F 16/9535* (2019.01); *G06F 16/2462* (2019.01); *G06F 16/51* (2019.01);
(Continued)

(58) Field of Classification Search
CPC .... G06F 16/2462; G06F 16/51; G06F 16/532; G06F 16/583; G06F 16/5866; G06F 16/951; G06F 16/9535
(Continued)

(56) References Cited

U.S. PATENT DOCUMENTS 6,912,505 B2 6/2005 Linden
7,499,965 B1 3/2009 Chai
(Continued)

*Primary Examiner* — Michelle N Owyang
(74) *Attorney, Agent, or Firm* — Heidi Brun Associates Ltd.

(57) ABSTRACT

Each image of a plurality of user-defined collections of images has properties associated therewith. A seed image is defined as currently viewed or selected image and the properties associated with the seed image are retrieved. The seed image is used to identify seed collections as the collections of images which have the seed image as one of their images. A plurality of candidate images are identified from the seed collections. For each candidate image, a significance score is determined as a function of either the number of seed collections to which the candidate image belongs or the ratio of the number of seed collections to the set of all collections to which the candidate image belongs. Each candidate image is ranked based on the significance scores and the seed image properties. At least one candidate image is recommended to the user based on the ranking of the candidate images.

9 Claims, 5 Drawing Sheets

Related U.S. Application Data continuation of application No. 13/791,628, filed on Mar. 8, 2013, now Pat. No. 9,535,996.

(60) Provisional application No. 61/695,010, filed on Aug. 30, 2012.

(51) Int. Cl.
  *G06F 16/51* (2019.01)
  *G06F 16/532* (2019.01)
  *G06F 16/583* (2019.01)
  *G06F 16/951* (2019.01)
  *G06F 16/2458* (2019.01)
  *G06F 16/58* (2019.01)

(52) U.S. Cl.
  CPC .......... *G06F 16/532* (2019.01); *G06F 16/583* (2019.01); *G06F 16/5866* (2019.01); *G06F 16/951* (2019.01)

(58) Field of Classification Search
  USPC .................................................. 707/705–780
  See application file for complete search history.

(56) References Cited

U.S. PATENT DOCUMENTS

| | | |
|---|---|---|
| 7,836,050 B2 | 11/2010 | Jing |
| 8,117,216 B1 | 2/2012 | Chanda |
| 8,244,664 B2* | 8/2012 | Ghosh .................... G06Q 10/10 706/54 |
| 8,761,512 B1 | 6/2014 | Buddemeier |
| 8,868,596 B2 | 10/2014 | Zelevinsky |
| 8,923,626 B1 | 12/2014 | Stewenius |
| 8,990,199 B1* | 3/2015 | Ramesh ............... G06F 16/5838 707/736 |
| 2003/0145002 A1 | 7/2003 | Kleinberger |
| 2006/0222244 A1 | 10/2006 | Haupt |
| 2007/0094066 A1 | 4/2007 | Kumar |
| 2007/0233671 A1 | 10/2007 | Oztekin |
| 2009/0060348 A1 | 3/2009 | Monro |
| 2010/0049498 A1 | 2/2010 | Cao |
| 2010/0198773 A1 | 8/2010 | Wallisch |
| 2011/0022606 A1* | 1/2011 | Mason .................... G06Q 30/02 707/748 |
| 2011/0035379 A1 | 2/2011 | Chen |
| 2011/0040717 A1 | 2/2011 | Rho |
| 2011/0131202 A1* | 6/2011 | Cohen .................... G06Q 30/02 707/723 |
| 2011/0264641 A1 | 10/2011 | Yang |
| 2011/0302032 A1 | 12/2011 | Ishii |
| 2012/0066219 A1 | 3/2012 | Naaman |
| 2012/0239650 A1 | 9/2012 | Kim |
| 2012/0269441 A1 | 10/2012 | Marchesotti |
| 2012/0316986 A1 | 12/2012 | Levy |
| 2013/0011012 A1 | 1/2013 | Yonaha |
| 2013/0159317 A1 | 6/2013 | Huang |

* cited by examiner

SELECTING CONTENT OBJECTS FOR RECOMMENDATION BASED ON CONTENT OBJECT COLLECTIONS

CROSS REFERENCE TO RELATED APPLICATIONS

This application is a continuation of U.S. application Ser. No. 15/376,666, filed Dec. 13, 2016, now U.S. Pat. No. 10,417,294, which is a continuation of U.S. application Ser. No. 13/791,628, filed Mar. 8, 2013, now U.S. Pat. No. 9,535,996, which claims the benefit of U.S. Provisional Application No. 61/695,010, filed Aug. 30, 2012, all of which are incorporated by reference in their entirety.

FIELD OF ART

The present disclosure generally relates to the field of content objects, and more specifically to the ranking of content objects for recommendation to a user based on collections of content objects.

BACKGROUND

The Internet has become a medium for the display and playback of various forms of content objects. As used herein, "content object" can refer to digital text (such as a document, a poem, a book, an article, a spreadsheet, and the like), a digital image (such as a digital version of a photograph, a painting, a drawing, a computer-made image, and the like), digital video (such as a digital feature film, a home-video or other amateur-captured video, a music video), a digital sound recording (such as a digital song, a speech, or any other audio clip), a digital animation (such as a .GIF animation, a cartoon, still-motion video, and the like), or any other form of content that is displayed, viewed, or played on a user device over the internet.

Content hosting services on the Internet allow users to access content on the content hosting services for display and playback. Content hosting services can allow users to upload content objects to the content hosting services. The content objects uploaded by users may be user-generated content objects, such as images of real-world physical artwork created by the user or images including digital artwork created by the user. Content hosting services can also retrieve content objects from other entities, such as professional movie studios, professional music studios, libraries, and the like.

Once content is stored at a content hosting service, users can browse and view or play the content. In order to aid a user in viewing content of interest to the user, a content hosting service can recommend various content to the user. Selecting relevant content to recommend to a user is very challenging, particularly in the field of digital art, as a user's visual tastes can vary in a difficult-to-predict way.

SUMMARY

There is therefore provided, in accordance with a preferred embodiment of the present invention, a method of selecting an image for recommendation to a user of a content hosting service. The method operates on the content hosting service, which has a content storage module, a collection storage module and a processor and is operative with a client module. The method includes storing a plurality of user-defined collections of images in the collection storage module from a plurality of the users of the content hosting service, where each image has properties associated therewith. A seed image is defined as an image currently viewed or selected by a current user and the processor retrieves the properties associated with the seed image. The seed image is used to identify seed collections from among the user-defined collections of images which have the seed image as one of the images of the seed collection. The plurality of candidate images are identified for recommendation from the selected seed collections. For each candidate image, a significance score is determined as a function of either the number of seed collections to which the candidate image belongs or the ratio of the number of seed collections to the set of all collections to which the candidate image belongs. Each candidate image is ranked based on the significance scores and on the seed image properties and at least one candidate image is recommended to the user via the client module based on the ranking of the candidate images.

There is alternatively therefore provided, in accordance with a preferred embodiment of the present invention, a method of selecting an image for recommendation to a user of a content hosting service. The method operates on the content hosting service, which has a content storage module, a collection storage module and a processor and is operative with a client module. The method includes storing a plurality of user-defined collections of images in the collection storage module from a plurality of the users of the content hosting service, where each image has properties associated therewith. A set of seed images is defined as an image currently viewed or selected by a current user and the processor retrieves the per-seed-image properties associated with the set of seed images. The set of seed images is used to identify seed collections from among the user-defined collections of images which have at least one of the seed images as one of the images of the selected seed collections. The plurality of candidate images are identified for recommendation from the selected seed collections. For each candidate image, a significance score is determined as a function of either the number of seed collections to which the candidate image belongs or the ratio of the number of seed collections to the set of all collections to which the candidate image belongs. Each candidate image is ranked based on the significance scores and on the per-seed-image properties and at least one candidate image is recommended to the user via the client module based on the ranking of the candidate images.

Moreover, in accordance with a preferred embodiment of the present invention, the seed image properties include a category of the seed image or characteristics of the seed image.

Further, in accordance with a preferred embodiment of the present invention, characteristics of the seed image the seed image properties include tags associated with the seed image.

Still further, in accordance with a preferred embodiment of the present invention, characteristics of the seed image the method includes retrieving extrinsic properties of the seed image to use in the ranking.

There is also provided, in accordance with a preferred embodiment of the present invention, a content hosting system including a processor and operative with a client module. The system includes a collection storage module and a content recommendation engine. The collection storage module stores a plurality of user-defined collections of images from a plurality of the users of the content hosting service, each the image having properties associated therewith. The content recommendation engine is operative on the processor to select an image for recommendation to a user of the content hosting service. The engine includes a seed object module, a candidate identification module and a ranker. The seed object module defines a seed image as an image currently viewed or selected by a current user, retrieves the properties associated with the seed image and uses the seed image to identify seed collections from among the user-defined collections of images which have the seed image as one of the images of the seed collection. The candidate identification module identifies a plurality of candidate images for recommendation from the selected seed collections and determines for each candidate image, a significance score as a function of either the number of seed collections to which the candidate image belongs or the ratio of the number of seed collections to the set of all collections to which the candidate image belongs. A ranker ranks each candidate image based on the significance scores and on the seed image properties and recommends at least one candidate image for recommendation to the user via the client module based on the ranking of the candidate images.

Moreover, in accordance with a preferred embodiment of the present invention, the seed image properties include a category of the seed image or characteristics of the seed image.

Further, in accordance with a preferred embodiment of the present invention, characteristics of the seed image the seed image properties include tags associated with the seed image.

Still further, in accordance with a preferred embodiment of the present invention, the ranker further to retrieve extrinsic properties of the seed image to use in the ranking.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments for purposes of illustration only. One skilled in the art will readily recognize from the following description that alternative embodiments of the structures and methods illustrated herein is employed without departing from the principles of the invention described herein.

DETAILED DESCRIPTION

Overview

Figure 1:
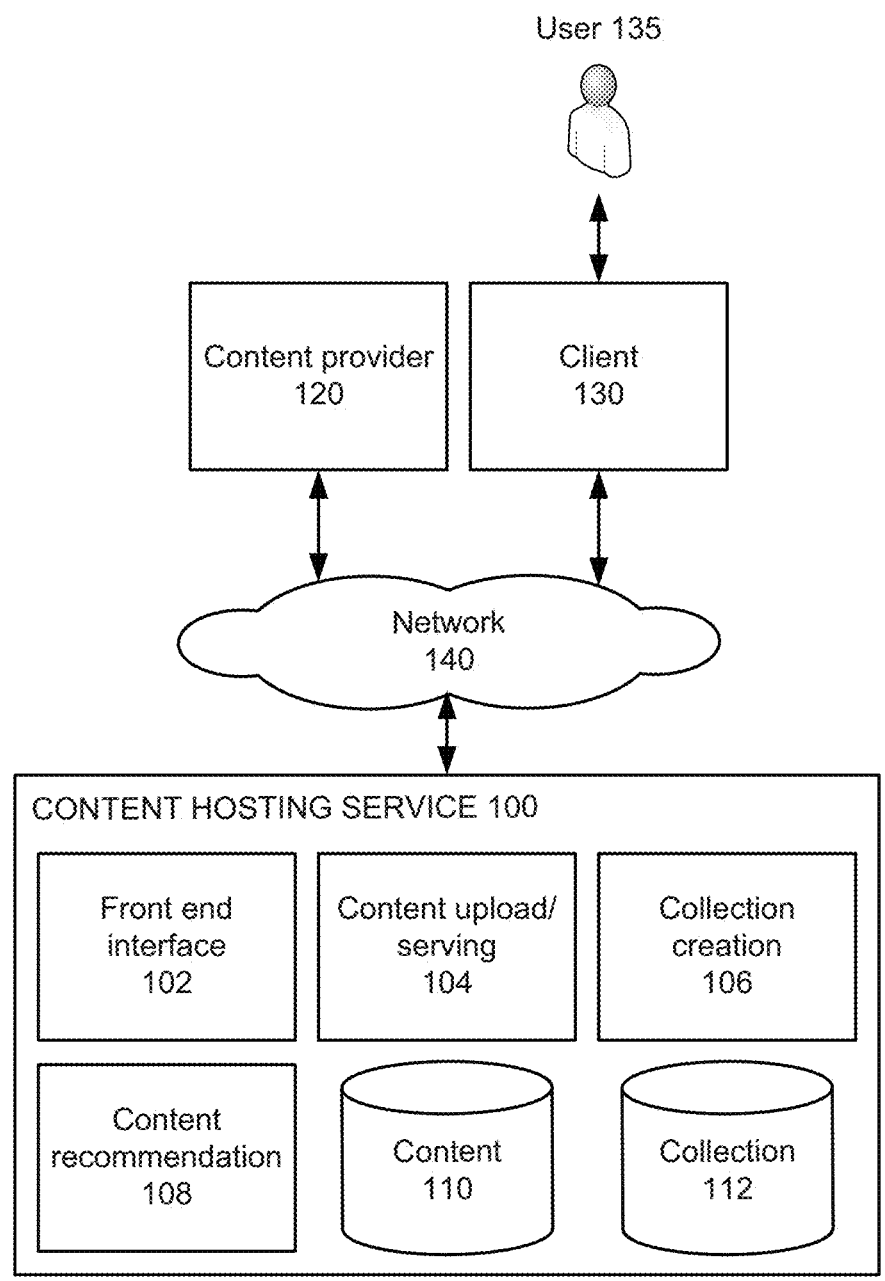
FIG. 1 is a block diagram of a content hosting service environment configured to make content object recommendations to a user, according to one embodiment.

FIG. 1 is a block diagram of a content hosting service environment configured to make content object recommendations to a user, according to one embodiment. The embodiment of FIG. 1 includes a content hosting service 100, a content provider 120, and a client 130, communicatively coupled through the network 140. The content provider 120 provides one or more content objects (collectively referred to herein as "content" or "objects") to the content hosting service 100. The content is of any digital form or format capable of display or playback at the client 130 to a user. It should be noted that although only one content provider 120 and one client 130 are displayed in the embodiment of FIG. 1, in practice, other embodiments can have any number of either entity, for instance hundreds of content providers and millions of clients.

Content objects can come in a variety of formats. For instance, text-based content objects may be any format capable of displaying text to a user, such as the .doc format, the .pdf format, the .txt format, any of the variety of e-book formats, .xls, or an image of text. Image-based content objects may be any format capable of displaying an image to a user, such as the .jpeg format, the .tiff format, the .png format, the .gif format, and the .bmp format. Video-based and animation-based content objects may be any format capable of being played to a user, such as the family of MPEG formats, the .avi format, the .mov format, the .mp4 format, the .mkv format, and the .wmv format. Sound-based and audio-based content objects may be any format capable of being played to a user, such as the .mp3 format and the .wav format. Additional content objects can include games and applications (for instance, computer applications, mobile applications, or web-based applications).

The content provider 120 and the client 130 may be any device or service capable of transmitting and/or receiving content from the content hosting service 100 over the network 140. In one embodiment, the content provider 120 and the client 130 are computing devices that execute client software, e.g., a web browser or built-in client application, to connect to, upload content to, and receive content from the content hosting service 100 via a network 140, and to display or playback content. The content provider 120 and the client 130 might be, for example, a personal computer, a personal digital assistant, a mobile phone or smart phone, a tablet, a laptop computer, an internet-enabled television or set-top receiver, and the like. The network 140 is typically the Internet, but may be any network, including but not limited to a LAN, a MAN, a WAN, a mobile wired or wireless network, a private network, or a virtual private network.

Generally, the content provider 120 provides content objects to the content hosting service 100 and the client 130 displays or plays the provided content objects. In practice, the content provider 120 and the client 130 may be the same device, for instance when the content object provided is created by the user 135. Additionally, the content provider 120 may be the same entity that operates the content hosting service 100. In one embodiment, the content hosting service 100 exposes an application programming interface that enables the content provider 120 to perform various functions at the content hosting service 100. Content provider functions can include, for example, uploading a content object to the content hosting service 100, editing a content object stored by the content hosting service 100, and identifying various properties of content stored by the content hosting service 100, such as the author or creator of the content, the category of the content, the date of the creation of the content, the identity of any individuals associated with the creation of the content (for instance, the actors in video content, the musical artist in song content, etc.), commentary or quality rating of the content, or any other property associated with the content.

Similarly, the content hosting service 100 exposes an application programming interface that enable a client device to perform various client functions at the content hosting service 100. Client functions include enabling a user to establish an account at the content hosting service 100, to browse content objects at the content hosting service 100, to identify various properties of content stored by the content hosting service 100 (as discussed above), and to make purchases associated with the content objects stored by the content hosting service 100 (such as physical prints of content object images).

One such client function that a user of a content provider or a client device can perform is organizing content objects stored at the content hosting service 100 into collections. As used herein, the one or more content objects organized into a collection are referred to as "members" of the collection. A collection of content objects is a set of associated content objects stored at the content hosting service 100. The set of content objects in a collection may be selected by a user. For example, a user can assemble a collection of content objects, and each of the content objects in the collection can have one or more properties in common. A collection can include content objects selected based on the type of content object (for instance, videos, oil paintings, sculptures, photographs, etc.), based on the subject matter or theme of the content object (e.g., dogs, baseball, flowers), based on the author or creator of the content object, or based on any other property of content objects identifiable by meta-data stored in conjunction with the content objects. Collections can also include content objects selected based on subjective properties, for instance properties reflective of a user's taste in content objects, and thus are not limited to groups of content objects with common objective properties. It should be noted that a user can create a collection without explicitly intending to create a collection. For example, a collection may be automatically created based on objects that a user views during a viewing session, during a period of time, and the like. A collection can also be created automatically. For example, without explicit user input, the collection creation module 106 can automatically group content objects into collections based on the type of content object, the category of the object, the author or creator of the content object, the inherent data of the content object (such as its visual appearance, sound, or text), recorded user behavior relating to the content, or based on any other property of content objects identifiable by meta-data stored in conjunction with the content objects.

The content hosting service 100 represents a system such as that of DEVIANTART™ that stores and provides content objects such as images to users via clients such as the user via the client 130. The content hosting service 100 communicates with content providers and clients via the network 140 to facilitate the receiving of and displaying/playback of content objects between entities. The content hosting service 100 may be implemented in a cloud computing network, accessible by the content provider 120 and the client 130 over the network 140. The content hosting service 100 is configured to make content object recommendations to a user based on, for example, the content object being viewed by the user and the properties of the content object, and collections of content objects organized by other users and the properties of the content objects in the collections. It should be noted that while the description herein may focus on image-based content objects for the purposes of simplicity, the principles discussed herein are equally applicable to all forms and formats of content objects.

The content hosting service 100 includes a front-end interface 102, a content upload/serving module 104, a collection creation module 106, a content recommendation engine 108, a content storage module 110, and a collection storage module 112. Other conventional features, such as firewalls, load balancers, authentication servers, application servers, failover servers, site management tools, and so forth, are not shown so as to more clearly illustrate the features of the content hosting service 100. While an example of a suitable content hosting service 100 is the DEVIANTART website, found at www.deviantart.com, other content hosting sites can be adapted to operate according to the teachings disclosed herein. The content hosting service 100 may display or play content objects to a user via a content hosting service interface, such as a GUI associated with a website or service. The illustrated components of the content hosting service 100 can be implemented as single or multiple components of software or hardware. In general, functions described in one embodiment as being performed by one component can also be performed by other components in other embodiments, or by a combination of components. Furthermore, functions described in one embodiment as being performed by components of the content hosting service 100 can also be performed by a content provider 120 in other embodiments, if appropriate. It should be further appreciated that the various functions described herein for the content hosting service 100, and in particular those functions relating to the selection, identification, and recommendation of content objects and collections, are sufficiently complex as to require their implementation in a computer system, and cannot be performed by mental steps.

The front-end interface 102 provides the interface between the various components of the media hosting service 100 and the content provider 120 and client 130. The content upload/serving module 104 receives content objects from the content provider 120 and stores the content objects in the content storage module 110, for instance, at the request of the content provider. The content upload/serving module 104 can store meta-data and other data describing the properties of received content objects with the content objects in the content storage module 110. Each content object stored in the content storage module 110 can include or be associated with a unique object identifier. The content upload/serving module 104 also retrieves content objects stored at the content storage module 110 and transmits the retrieved content objects to the client 130, for instance, at the request of the client 130. Although not illustrated the embodiment of FIG. 1, the content hosting service 100 may include additional components allowing a user of a client 130 to perform various client functions as described above, for instance, searching or content objects stored at the content hosting service 100 such as by entering textual queries containing keywords of interest, or browsing content objects stored at the content hosting service 100 such as by filtering content objects by content object type, creator, category, and the like.

The collection creation module 106 allows a user to create a collection of content objects for storage by the content hosting service 100. Created collections are stored in the collection storage module 112, which includes a data repository such as a relational database, key-value database, or other database management implementations. Collections may be stored by, for example, storing a unique collection identifier in conjunction with a unique object identifier for each content object in the collection. It should be noted that any given content object can be a member of multiple different collections created by multiple different users. In some embodiments, a collection (a "parent collection") can also include another collection (a "child collection") as a member. In these embodiments, all content objects belonging to the child collection are included as members of the parent collection.

Stored collections are associated with an identifier for a particular user or a user account that created the collection, along with information entered by the user describing the collection (e.g., textual description, keywords, labels, etc.), a designation as to whether the collection is public or private, or any other information related to the collection or the content objects in the collection. The content hosting service 100 is configured to allow a user to browse a stored collection, for instance, by displaying all of the content objects belonging to the collection. The content storage module 110 stores indices for the stored content objects, and the collection storage module 112 stores indices for the collections. The stored indices allow objects and collections to be searched by their author, uploader, keyword, subject matter, themes, content types, or any of the properties of the content objects and collections. Thus, the front-end interface 102 is configured to receive from a client 130 a search query, such as keywords, content or collection properties, and pass that query to the content storage module 110 and the collection storage module 112, which returns results identifying stored content objects and stored collections relevant to the performed searches. For example, a user can search "landscape watercolors," and the content hosting service 100 can return a mix of content objects related to landscape watercolors and collections related to or containing landscape watercolor art. It should be noted that the content objects stored in the content storage module 110 may be indexed by collections to which each content object is a member, allowing a user to query the content hosting service 100 using a particular content object to identify collections to which a content object is a member.

The content recommendation engine 108 is configured to recommend content objects to a user, and is described in greater detail below with regards to FIG. 2. The content recommendation engine 108 is configured to identify one or more candidate content objects to recommend to a user, and is configured to rank and select one or more of the candidate content objects for recommendation. "Recommending" a content object can include displaying the content object to the user via a content hosting service interface displayed on the client 130. For example, a user can view a particular image stored at the content hosting service 100 in an interface on a website associated with the content hosting service 100, and the content hosting service 100 can display one or more recommended content objects in a different part of the interface, for instance below the particular image, in an interface margin, or in a dedicated "recommended content objects" portion of the interface.

Identifying Candidate Objects

Figure 2:
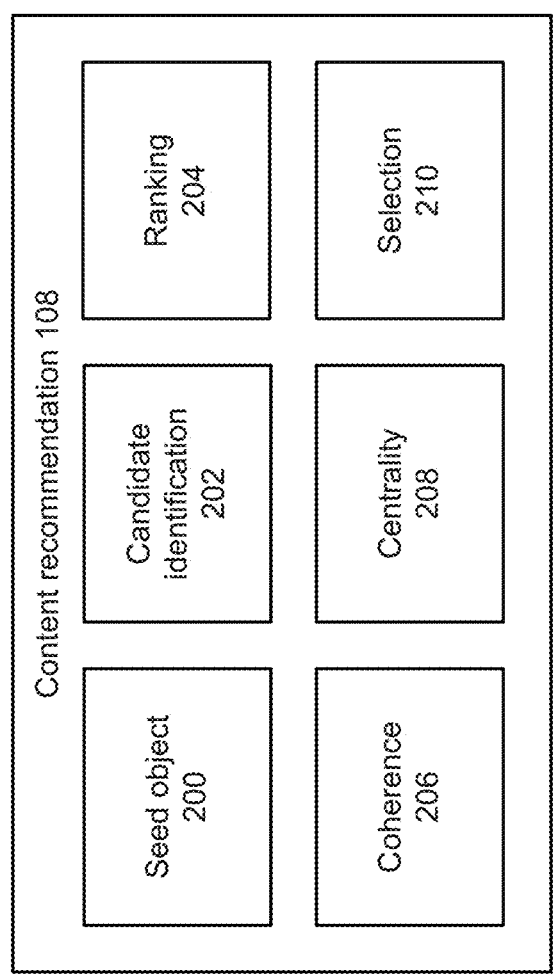
FIG. 2 illustrates the various components of a content recommendation engine, according to one embodiment.

FIG. 2 illustrates the various components of a content recommendation engine, according to one embodiment. The content recommendation engine 108 includes a seed object module 200, a candidate identification module 202, a ranking module 204, a coherence module 206, a centrality module 208, and a selection module 210. In other embodiments, the content recommendation engine 108 can include fewer, additional, or different modules, the functionalities of which may be distributed or performed differently than described herein.

When a user of the client device is viewing an individual content object, either from a search result, browsing, or other access, the front-end interface 102 passes the object identifier for the content object to the seed object module 200. Given the content object identifier, the seed object module 200 retrieves content object property information associated with the seed object, such as meta-data stored in conjunction with the seed object, the categorical organization of the seed object, the creator or uploader of the seed object, the characteristics of the seed object (whether raw characteristics, such as the resolution, the dimensions, the file size, the run length, and the like; or processed characteristics, such as a color or shape distribution, image area, aural frequencies, word frequencies, and the like), user-created or computer-created tags for the seed object, or any other information related to the seed object (referred to herein as the "properties" of the seed object). It should be noted that although reference is made herein to a single seed object, the principles described herein apply equally to a set of seed objects.

The candidate identification module 202 identifies a set of candidate content objects (referred to herein as "candidate objects") for recommendation to a user based on the seed object. To identify candidate objects, the candidate identification module 202 identifies one or more collections of which the seed object 200 is a member (referred to herein as "seed collections"). In one embodiment, identifying seed collections includes querying the collection storage module 112 of the embodiment of FIG. 1 with the object identifier of the seed object and retrieving the collection identifier of each collection that includes the seed object.

Once the candidate identification module 202 identifies the one or more seed collections, the candidate identification module 202 then identifies content objects (apart from the seed object) that are members of the seed collections. In one embodiment, identifying the content objects in the seed collections includes querying the collection storage module 112 using the collection identifier associated with each seed collection, and obtaining a set of object identifiers for the content objects that are members of each seed collection. Thus, the union of the set of identified content objects that are members of the seed collections makes up a set of candidate objects representing potential content objects for use by the content recommendation engine 108 in recommending a content object to a user.

Figure 3:
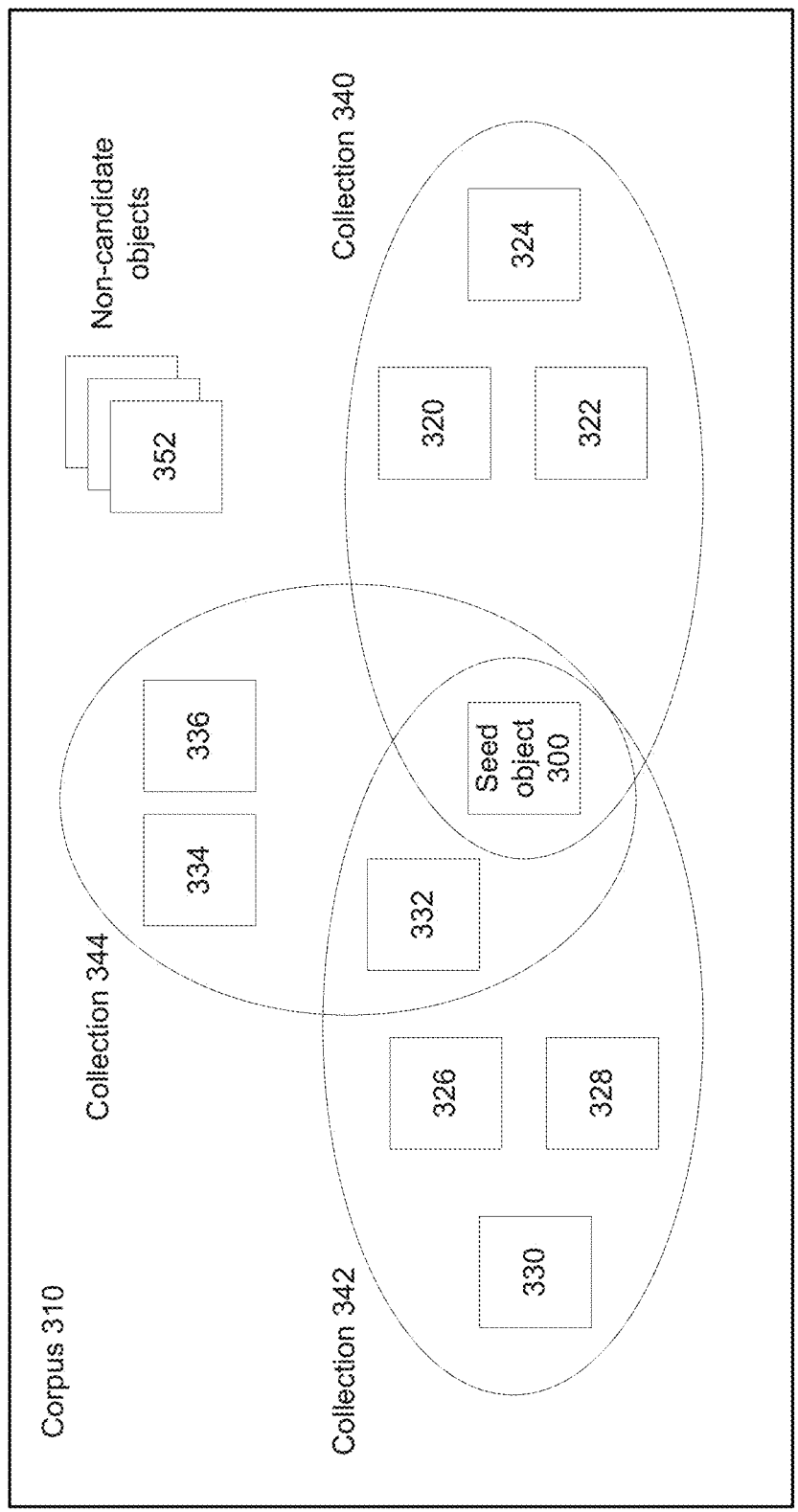
FIG. 3 illustrates a simple example embodiment of the organization of content objects in a corpus into collections, according to one embodiment.

FIG. 3 illustrates a simple example embodiment of the organization of content objects in a corpus into collections, according to one embodiment. FIG. 3 includes a corpus 310 of content objects, for instance content objects stored by the content hosting service 100 of FIG. 1. The corpus 310 includes a plurality of content objects such as the content object 300 (referred to as the "seed object"), the content objects 320, 322, 324, 326, 328, 330, 332, 334, 336, 352, and others not displayed in the embodiment of FIG. 3. Some of the content objects of the corpus 300 are organized into collections (for instance by machine or by users of the content hosting service 100 of FIG. 1). In the embodiment of FIG. 3, the collection 340 includes the content objects 300, 320, 322, and 324; the collection 342 includes the content objects 300, 326, 328, 330, and 332; and the collection 344 includes the content objects 300, 332, 334, and 336. In the embodiment of FIG. 3, the content object 352, and all other content objects either belong to collections not displayed in FIG. 3, or may not belong to collections.

In the context of the embodiment of FIG. 3, the seed object module 200 of FIG. 2 receives the identifier of the seed object 300 as a content object being displayed, played, or interacted with by a user. The candidate identification module 202 then identifies the seed collections that include the seed object 300 as a member, namely collection 340, collection 342, and collection 344. The candidate identification module 202 then identifies the other content objects in these seed collections as candidate objects, namely the objects 320, 322, 324, 326, 328, 330, 332, 334, and 336. Note that as the objects 352 and other objects in the corpus 310 are not members of a seed collection, such objects are not included in the set of identified candidate objects.

Ranking Candidate Objects

The ranking module 204 produces a ranking of the candidate objects identified by the candidate identification module 204 based on a variety of factors, the relevance of each candidate object to a user and a seed object, and accordingly based on the suitability of each candidate object to be recommended by the content recommendation engine 108. The ranking module 204 ranks the candidate objects based on a number of different criteria, such as the various measures of significance of the candidate object relative to the seed collections; the properties of the candidate objects, the seed object, the seed collections, or a viewing user; the coherence or entropy of the seed collections; the centrality of the seed object to the seed collections; or a combination of these criteria.

1. Ranking Based on the Significance of the Candidate Object Relative to the Seed Collections The ranking module 204 can use various measures of the significance of the candidate object relative to the seed collections to rank the object. One such measure is the number of seed collections to which a candidate object belongs. For example, the rank of a candidate object can be proportional to the number of seed collections to which the object is a member. Thus, the larger the number of seed collections to which a candidate object belongs, the higher the rank of the candidate object.

Another measure of significance is the importance of a candidate object to the seed collections to which the candidate object belongs relative to all collections at the content hosting service 100. In other words, a candidate object may be ranked based on the ratio of the number of seed collections to which the candidate object belongs to the number of all collections to which the candidate objects belong. In one embodiment, such a ranking is determined using a variant of the term frequency-inverse document frequency ("TF-IDF") weighting for each candidate object, treating the candidate object as a "term," and each collection as a "document." Alternatively, other methods of frequency normalization may be used to determine the ranking of each candidate object based on the importance of the candidate objects to the seed collections relative to all collections at the content hosting service 100.

2. Ranking Based on Properties of Objects, Collections, and a Viewing User

The ranking module 204 can rank the candidate objects in additional ways. In one embodiment, the ranking module 204 can rank the candidate objects based on extrinsic properties of the candidate objects and the seed object. For example, the ranking module 204 can rank the candidate objects based on a number of views or plays that a candidate object receives, based on a determined importance or relevance of the creator or uploader of the candidate object, or other properties that are not inherent in the object itself. Ranking can also be based on any of the intrinsic properties of the seed object and/or the candidate objects, which are those descriptive of each object and the object's author, such as a categorization of the object, tags associated with the object, the upload date of the object, and the like. Ranking can also be based on the extrinsic and intrinsic properties of the seed collections to which a candidate object belongs, such as a determined relevance of each seed collection, tags associated with the seed collection, or, in the case of user-created collections, the creator of the seed collection. In one embodiment, the ranking module 204 can rank the candidate objects based on characteristics of a viewing user of the object. For example, the ranking module 204 can rank the candidate objects based on user preferences (such as preferred content object formats or categorizations), based on past content object viewing or playing history of a user, and the like.

It should be noted that candidate objects may be ranked based on a combination of the significance of the candidate object relative to the seed collections and the properties of the candidate objects, the seed object, the seed collections, and a viewing user. For example, the ranking module 204 can initially rank candidate objects based on the number of seed collections in which each candidate object appears. As such a ranking method can result in multiple candidate objects sharing the same rank within the ranking, the ranking module 204 can adjust the ranking based on the categorization of the candidate objects using a category-preference ranking, which pre-ranks content objects categories (e.g., pre ranked categories based popularity of category or number of objects in the category). In such an example, the highest-ranked candidate objects are the candidate objects that belong to the most seed collections and that belong to the most highly pre-ranked categories. Alternatively, the ranking module 204 can adjust the ranking based on any other property of the candidate objects, the seed object, the seed collections, or the viewing user.

3. Ranking Based on the Significance of the Candidate Object Relative to the Seed Collections The ranking module 204 can rank candidate objects based on the coherence of the seed collections to which each candidate object belongs. The coherence module 206 determines the coherence (or relatedly, the entropy) of each seed collection for use in ranking the candidate objects by the ranking module 204. As used herein, the coherence of a seed collection is a measure of the similarity of the content objects in the seed collection to each other, or of the similarity of the properties of the content objects in the seed collection. Likewise, the coherence of a seed collection can refer to the distribution of the content objects in the seed collection, or of the properties of the content objects in the seed collection. Each seed collection can be represented by one or more collection vectors with entries representing the properties of the seed collection or of the objects belonging to the seed collection. The collection vectors may collectively be modeled as samples of a multivariate Gaussian distribution over the properties of the seed collection or the objects belonging to the seed collection. In such an embodiment, the coherence of the seed collection can refer to the reciprocal of the determinant of the covariance matrix of the Gaussian distribution. For example, the coherence module 206 can determine the coherence of a seed collection made up of images by determining the determinant of the covariance of the distribution of the colors of the images in the seed collection. The coherence of the seed collection can also refer to other functions of the covariance matrix which attempt to summarize the spread of the Gaussian data.

In one embodiment, the coherence module 206 determines the coherence of a seed collection by first determining a sample covariance matrix of the seed collection. The sample covariance matrix is based on a mean vector of latent tag vectors for each object in the seed collection. Each latent tag vector is the result of a linear transform of the tag vector of an object in the seed collection. The sample covariance matrix is further based on a corpus tag vector covariance matrix and a raw covariance matrix. The corpus tag vector covariance matrix is determined as follows:

$$S_{ij} = \frac{\sum_{y \in Y} w(y) M_{ij}(y)}{\sum_{y \in Y} w(y)} \quad \text{Equation 1}$$

In equation 1, y refers to a collection in a set of object collections Y, w(y) refers to a weight given to collection y, i and j are matrix indices, and $M_{ij}$ (y) refers to a sum of squares matrix of tag vector elements determined as follows:

$$M_{ij}(y) = \frac{1}{N(y)-1} \sum_{x \in y} (t_i(x) - \bar{t}_i(y))(t_j(x) - \bar{t}_j(y)) \quad \text{Equation 2}$$

In equation 2, N (y) refers to the number of objects in collection y, $t_i$(x) refers to a tag vector for object x, and $\bar{t}_i$(y) refers to a mean tag vector for object collection y. A raw covariance matrix is determined as follows:

$$\tilde{S}_{ij}(y) = \frac{1}{N(y)-1} \sum_{x \in y} (l_i(x) - \bar{l}_i(y))(l_j(x) - \bar{l}_j(y)) \quad \text{Equation 3}$$

In equation 3, $l_i$(x) refers to a latent tag vector for an object x in the seed collection y, and $\bar{l}_i$(y) refers to a mean vector of latent tag vectors for each object x in the seed collection y. The sample covariance matrix is determined as follows:

$$\bar{S}_{ij}(y) = \frac{k}{N(y)+k} \tilde{S}_{ij}(y) + \frac{\alpha k}{N(y)+k} S_{ij} \quad \text{Equation 4}$$

In equation 4, α and k refer to weights used to adjust the influence of $\tilde{S}_{ij}$ (y) and $S_{ij}$. The Gaussian coherence of a seed collection y is determined as follows:

$$\text{Coherence}(y) = \frac{1}{\det(\bar{S}_{ij}(y))} \quad \text{Equation 5}$$

In equation 5, det ($\bar{S}_{ij}$ (y)) refers to the determinant of the sample covariance matrix.

Alternatively, the coherence of a seed collection can be measured by a decreasing function of the entropy of the properties of the content objects in the seed collection. It should be noted that the distribution over which entropy is derived is not limited to the Gaussian model described above, and can for instance include a Dirichlet topic model. In such an embodiment, the coherence module 206 can determine the coherence of a seed collection by determining a decreasing function of the entropy of a distribution of measurements representing the properties of the objects belonging to the seed collection and the seed collection itself. For example, the coherence module 206 can determine the entropy of a seed collection made up of images based on the distribution of tags associated with the images, and can determine the coherence of the seed collection with respect to the tags associated with the images by taking the reciprocal of the determined entropy. It should be noted that the coherence module 206 may determine the coherence or entropy for each of a number of properties of the content objects in the seed collection, and then may average the determined coherences or entropies with respect to these properties to determine the coherence or entropy of the entire seed collection.

In one embodiment, the coherence module 206 determines the entropy of a seed collection as follows:

$$h(y) = - \sum_{c, N(c,y)>0} p(c, y) \log p(c, y) \quad \text{Equation 6}$$

In equation 6, c refers to a category, y refers to a collection, N(c, y) refers to the number of content objects in a collection y assigned to a category c, and p(c, y) is determined as follows:

$$p(c, y) = \frac{N(c, y) + \alpha}{N(y) + \beta} \quad \text{Equation 7}$$

In equation 7, N (y) refers to the number of objects in collection y, and α and β refer to small positive parameters for tuning p(c, y).

In addition to determining one or more collection vectors, the coherence module 206 can determine an object vector for each candidate object in a seed collection, with each object vector entry representing a particular property, such as a characteristic, measure, quantity, or value associated with the candidate object. The coherence module 206 can then determine the coherence or entropy of the seed collection based on the object vectors associated with the candidate objects in the seed collection. In the event that the object vectors are of a computationally-prohibitive dimensionality, the coherence module 206 may perform PCA/SVD on the object vectors in order to reduce the dimensionality the object vectors prior to determining the coherence or entropy of the seed collection. By performing PCA/SVD, the coherence module 206 can reduce or eliminate overlapping information in the object vectors in order to more accurately or more efficiently determine the coherence or entropy of the seed collection. It should be noted that in other embodiments, other dimensionality-reduction techniques are implemented.

The coherence module 206 can determine a coherence score for each seed collection. Each coherence score directly correlates to the coherence of the seed collection (where the coherence score increases as the determined coherence of the seed collection increases and vice versa), and inversely correlates to the entropy of the seed collection (where the coherence score decreases as the determined entropy increases, and vice versa). It should be noted that any quantification of the determined coherence or the determined entropy of a seed collection can be considered a coherence score; in such instances, a separate and/or distinct step of determining a coherence score based on a previously determined coherence or entropy is not necessary. The remainder of the description will be limited to embodiments where the coherence module 206 outputs a coherence score for each seed collection for the purposes of simplicity; in embodiments where a coherence or entropy distribution or other measure is outputted, the principles and methods described herein are equally applicable.

The ranking module 204 can rank the candidate objects based additionally on the coherence scores determined by the coherence module 206. In one embodiment, the ranking module 204 uses the coherence scores for the seed collections as scalar weights in ranking the candidate objects. In this embodiment, to determine a rank for each candidate object, the ranking module 204 adds the coherence scores together for each seed collection to which a candidate object belongs, and bases the rank on the coherence score sum. For example, if a first candidate object belonged in two seed collections and if a second candidate object belonged in three seed collections, the ranking module 204 can rank the second candidate object higher than the first candidate object if coherence scores are not taken into account. In this example, if the coherence scores for the two seed collections to which the first candidate object belongs are 0.8 and 0.7, and if the coherence scores for the three seed collections to which the second candidate object belongs are 0.9, 0.4, and 0.1, the ranking module 204 can rank the first candidate object (with a coherence score sum of 1.5) higher than the second candidate object (with a coherence score sum of 1.4).

It should be noted that in one embodiment, the determined coherence scores for each seed collection are used as scalar weights for use in adjusting the ranking of the candidate objects by the ranking module 204. In this embodiment, the ranking module 204 first ranks all candidate objects using TF-IDF or another method of frequency normalization, and then adjusts the rankings based on the sum of coherence score scalars for the seed collections to which each candidate object belongs (for instance by multiplying each candidate object's TF-IDF weight by the coherence score sum associated with the candidate object). For example, if the TF-IDF weight and the coherence score sum for a first candidate object are 1.0 and 1.5 (respectively), and the TF-IDF weight and the coherence score sum for a second candidate object are 1.2 and 1.0 (respectively), the second candidate object is ranked higher than the first if the ranking module 204 only considers TF-IDF weightings. However, if the ranking module 204 considers both TF-IDF weightings and coherence scores, the first candidate object (with a TF-IDF and coherence score sum product of 1.5) is ranked higher than the second (with a TF-IDF and coherence score sum product of 1.2).

Alternatively, the ranking module 204 can rank the candidate objects based on a combination of the coherence scores for the seed collections determined by the coherence module 206 and based on coherence scores for all other collections to which the candidate objects belong. The coherence module 206 can determine a coherence score (or other measure of coherence or entropy) for each collection stored at the content hosting service 100, for instance when requested by the content recommendation engine 108, or in advance. In this embodiment, the ranking module 206 can rank candidate objects based on (for each candidate object) the quotient resulting from dividing the sum of the coherence scores for seed collections to which the candidate object belongs by the sum of the coherence scores for all collections at the content hosting service 100 to which the candidate object belongs.

4. Ranking Based on the Centrality of the Seed Object to Each Seed Collection

The ranking module 204 can rank candidate objects based on the relatedness of the seed object to each seed collection (referred to herein as the "centrality" of the seed object to a seed collection). The centrality module 208 determines, for each seed collection, the centrality of the seed object to the seed collection and produces a centrality score for the seed collection representing the determined centrality. Generally, the centrality of the seed object to a seed collection indicates if the properties of the seed object are representative of the properties of the candidate objects in the seed collection. In one embodiment, a high centrality score indicates that the seed object is representative of the mean of the distribution of candidate objects in a seed collection, while a low centrality score can indicate that the seed object is representative of an outlier in the distribution of candidate objects in the seed collection. It should be noted that although reference is made herein to centrality scores, other embodiments can implement the methods described herein using other measures of centrality and without the explicit determination of a centrality score. In another embodiment, where the seed object itself is represented as a distribution of properties, a high centrality score indicates a high degree of similarity between the seed object's distribution and the distribution of the seed collection. In such an embodiment similarity between distributions can be calculated as the Kullback-Leibler divergence of the seed object's distribution with respect to the seed object's collection's distribution. In other embodiments, different measures of similarity between distributions can be used.

The centrality score for a seed collection can indicate the probability that the seed object is coherent to the seed collection. To determine the centrality score for a seed collection, the centrality module 208 can determine a Gaussian distribution of one or more particular properties of the candidate objects in a seed collection. The centrality module 208 can then determine the location in the determined distribution that represents the values of the one or more particular properties of the seed object, and can determine a centrality score based on this determined location relative to the mean of the distribution. In such an embodiment, the centrality score of a particular seed collection is directly correlated to the distance of a determined location in the distribution representing the seed object to the mean of the distribution.

The ranking module 204 can rank candidate objects based on the centrality scores for the seed collections associated with each candidate object. In one embodiment, the average centrality score for the seed collections associated with a candidate object is determined for each candidate object, and the candidate objects are ranked based on the average centrality scores. Alternatively, for each candidate object, a highest centrality score is determined from among the seed collections associated with the candidate object, and the candidate objects are ranked based on the determined highest centrality scores.

The ranking module 204 can eliminate candidate objects from consideration prior to ranking the candidate objects based on the centrality scores determined by the centrality module 208. The ranking module 204 can remove candidate objects belonging only to seed collections associated with a centrality score that falls below a pre-determined threshold. For example, if the centrality module 208 determines that a seed collection has a very low centrality score (below a particular threshold), the ranking module 204, prior to ranking candidate objects, can eliminate candidate objects from consideration for ranking that belong only to the seed collection. The ranking module 204 can retain only candidate objects that belong to at least one seed collection associated with a centrality score that exceeds a pre-determined threshold.

Likewise, the ranking module 204 can eliminate candidate objects from consideration prior to ranking the candidate objects based on a combination of the centrality scores for the seed collections determined by the centrality module 208 and the coherence scores for the seed collections determined by the coherence module 206. In this embodiment, the ranking module 204 can determine, for each seed collection, the product of the coherence score and the centrality score associated with the seed collection. The ranking module 204 can eliminate from consideration candidate objects belonging only to seed collections with a determined coherence score and centrality score sum, product, or weighted average that falls below a pre-determined threshold. The ranking module 204 can also only retain candidate objects for ranking consideration belonging to at least seed collection with a determined coherence score and centrality score product that exceeds a pre-determined threshold.

In one embodiment, the centrality module 208 can determine a centrality score for each seed collection prior to the identification of candidate objects by the candidate identification module 202. In this embodiment, the candidate identification module 202 can select candidate objects only from seed collections that have a centrality score above a pre-determined threshold. In this embodiment, a content object belonging to a seed collection with a centrality score below a pre-determined threshold is selected as a candidate object only if the content object also belongs to a seed collection with a centrality score above the pre-determined threshold. A centrality score for a seed collection can also be combined with a coherence score for the seed collection so that the combined centrality/coherence score can be compared to the scores of other objects in other collections.

Selection of Candidate Objects for Recommendation

The selection module 210 selects one or more of the ranked candidate objects for display to a user as a recommended content object. The selection module 210 can select the top ranked candidate object, or a top ranked plurality of candidate objects for display to a user. In one embodiment, the selection module 210 can select from among a top ranked portion of candidate objects. For example, the selection module 210 can select the top ranked candidate object that a user has not previously viewed or played, or can select the top ranked candidate object in a category or having a tag in common with the seed object. Any selection criteria can be used by the selection module 210 such that one or more candidate objects are selected based on the ranking of candidate objects determined by the ranking module 204.

It should be noted that the one or more candidate objects may not be explicitly ranked against each other prior to selection by the selection module 210. In such an embodiment, the ranking module 204 can instead determine a score for each of the candidate objects, or can eliminate a set of candidate objects from consideration for selection by the selection module 210. In this embodiment, the selection module 210 can select from among the candidate objects randomly, based on the properties of the candidate objects or the seed objects, based on the characteristics of a user, based on the determined coherency of the candidate objects or centrality of the seed collections, or based on any other criteria. Once selected, the one or more selected candidate objects is sent by (for example) the content hosting service 100 of FIG. 1 to (for example) the client 130 for display to or playback by a user.

Operation

Figure 4:
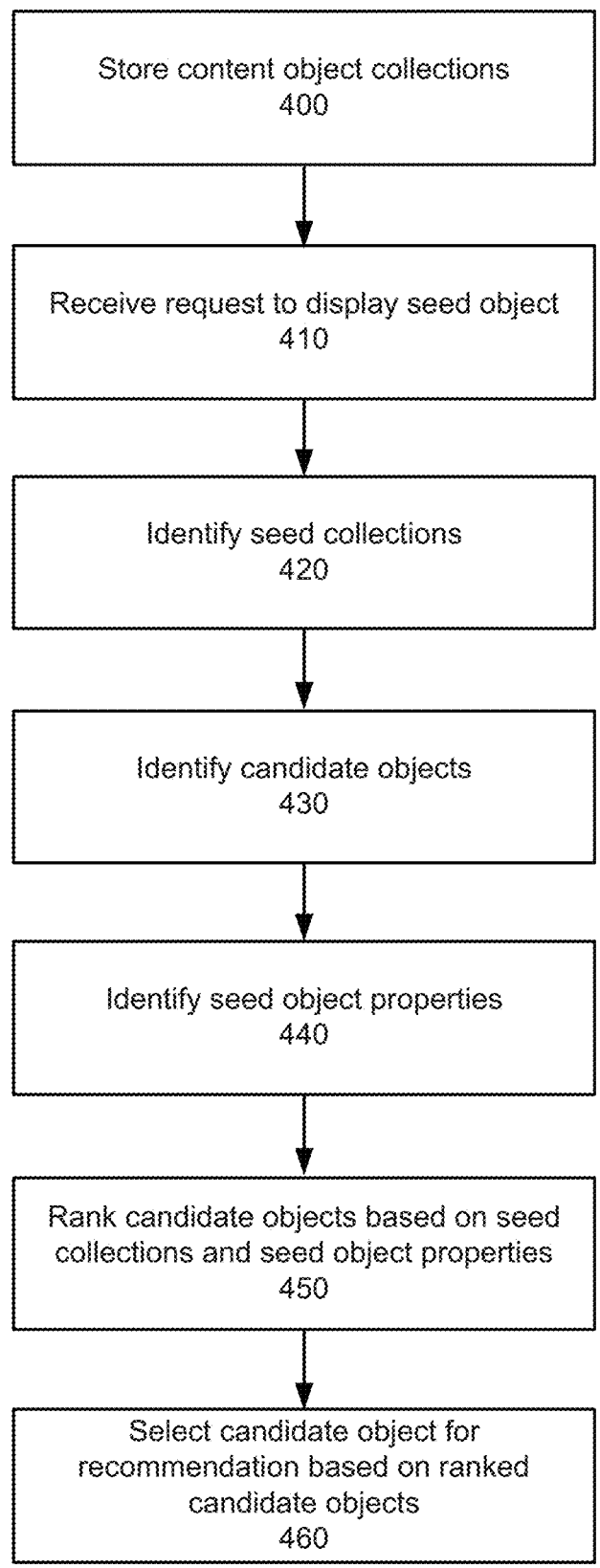
FIG. 4 is a flowchart of a process for selecting a content object for recommendation, according to one embodiment.

FIG. 4 is a flowchart of a process for selecting a content object for recommendation, according to one embodiment. Content object collections are stored 400. The collections of content objects may be user-generated, and may be received from users collectively across a user base. Alternatively, the collections may be machine-generated, and may be organized into collections based on the properties of the content objects.

A request is received 410 to display a seed object. The request is received from a user, for instance, through a client device operated by the user. The user may select the seed object for display via an interface provided to the client device. In response to receiving the request, seed collections are identified 420 and candidate objects are identified 430. Seed collections are identified by querying the stored collections with a unique identifier for the seed object, and identifying the stored collections that are associated with the identifier. The candidate objects can include all content objects belonging to the seed collections. The properties of the seed object are also identified 440. The properties of the seed object can include the characteristics of the seed object, whether raw or processed characteristics, and the categorization of the seed object, the tags associated with the seed object, the authorship of the seed object, and the like.

The candidate objects are ranked 450 based on the identified seed collections and the identified seed object properties. The candidate objects may be ranked based on the number of seed collections to which each candidate object belongs, based on the importance of each candidate object to the seed collections in the context of all stored collections, based on the properties each candidate object has in common with the seed object, and the like. A candidate object is then selected 460 for recommendation based on the ranking of candidate objects. The top ranked candidate object may be selected, or one or more candidate objects may be selected from among a top ranked number of candidate objects.

Figure 5:
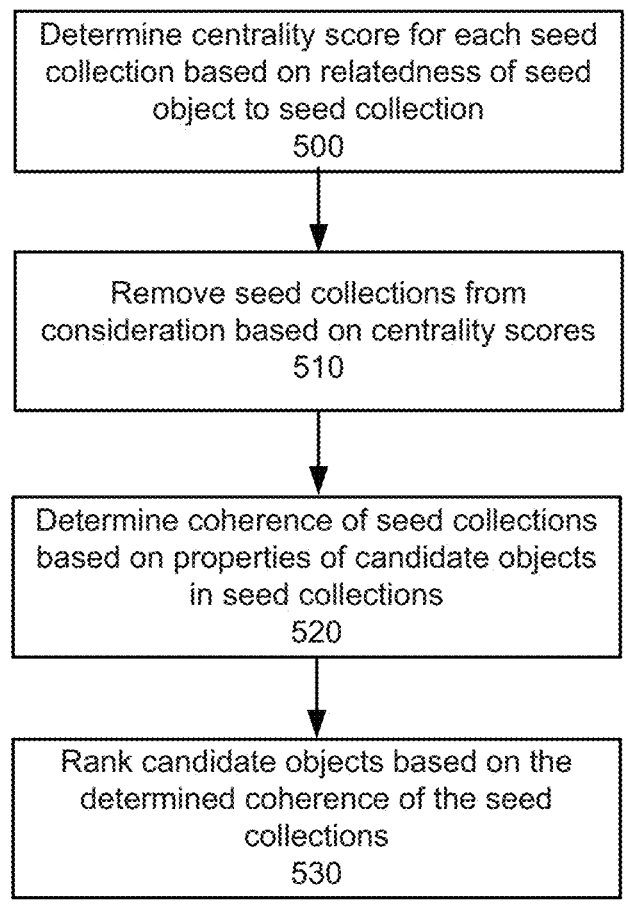
FIG. 5 is a flowchart of a process for ranking candidate content objects for recommendation based on the centrality of a seed object to each collection and the coherence of each seed collection, according to one embodiment.

FIG. 5 is a flowchart of a process for ranking candidate content objects for recommendation based on the centrality of a seed object to each collection and the coherence of each seed collection, according to one embodiment. A centrality score is determined 500 for each seed collection based on the relatedness of the seed object to the seed collection. The relatedness of the seed object to a seed collection can be determined by comparing the distribution of properties of candidate objects in a seed collection to the properties of the seed object, for instance, by determining the distance from the seed object in the distribution to the mean of the distribution. Seed collections can be removed 510 from consideration in ranking candidate objects based on the centrality scores. For example, identifying candidate objects can involve identifying the content objects that belong to seed collections with a centrality score above a pre-determined threshold.

The coherence of each seed collection is determined 520 based on the properties of the candidate objects in each seed collection. For example, the coherence of each seed collection can be determined based on the variance or the entropy of the properties of the candidate objects in the seed collection. In one embodiment, a coherence score is determined for each seed collection. The candidate objects are ranked 530 based on the determined coherence of the seed collections. For example, the candidate objects associated with seed collections with a high coherence score can be ranked higher than the candidate objects associated with seed collections with a low coherence score.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determine" refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method of selecting an image for recommendation to a user of a content hosting service, the method operating on the content hosting service having a content storage module, a collection storage module and a processor and operative with a client module, the method comprising:

storing a plurality of collections of images in said collection storage module of said content hosting service, each said image having image properties associated therewith;

via said processor, defining a seed image as an image currently viewed or selected by a current user, and retrieving properties associated with said seed image;

via said processor, using said seed image to identify seed collections from among said collections of images of which said seed image is a member;

via said processor, selecting a plurality of candidate images from said identified seed collections as a function of at least one of: a coherence score of said identified seed collections and centrality scores of said seed images and said candidate images;

via said processor, determining for each said candidate image, a significance score as a function of either: a number of seed collections of which said candidate image is a member, or, a ratio of said number of seed collections of which said candidate image is a member to a number of collections of images of which said candidate image is a member;

via said processor, ranking each said candidate image based on said significance scores and on seed image properties; and via said processor, recommending at least one said candidate image for recommendation to said current user via said client module based on said ranking of said candidate images.

2. The method of claim 1, wherein said coherence score and said centrality score are calculated as a function of at least one of: said images and said image properties.

3. The method of claim 2, wherein said image properties comprise at least one of: a category, a tag associated with said images, characteristics of said images, extrinsic properties of said images, intrinsic properties of said images, subjective properties of said images, and objective properties of said images.

4. A method of selecting an image for recommendation to a user of a content hosting service, the method operating on the content hosting service having a content storage module, a collection storage module and a processor and operative with a client module, the method comprising:

storing a plurality of collections of images in said collection storage module of said content hosting service, each said image having properties associated therewith;

via said processor, defining a set of seed images as a set of images currently viewed or selected by a current user-and retrieving said per-seed-image properties associated with said set of seed images;

via said processor, using said set of seed images to identify seed collections from among said collections of images in which at least one image of said set of seed images is a member of said identified seed collection;

via said processor, selecting a plurality of candidate images from said identified seed collections as a function of at least one of: a coherence score of said identified seed collections and centrality scores of said seed images and said candidate images;

via said processor, determining for each said candidate image, a significance score as a function of either: a number of seed collections of which said candidate image is a member, or a ratio of said number of seed collections of which said candidate image is a member to a number of collections of images to which said candidate image is a member;

via said processor, ranking each said candidate image based on said significance scores and on seed image properties; and via said processor, recommending at least one said candidate image for recommendation to said current user via said client module based on said ranking of said candidate images.

5. The method of claim 4, wherein said coherence score and said centrality score are calculated as a function of at least one of: said images and said image properties.

6. The method of claim 5 wherein said image properties comprise at least one of: a category, a tag associated with said images, characteristics of said images, extrinsic properties of said images, intrinsic properties of said images, subjective properties of said images, and objective properties of said images.

7. A content hosting system comprising a processor and operative with a client module, the system comprising:

a collection storage module to store a plurality of collections of images of said content hosting service, each said image having image properties associated therewith; and a content recommendation engine operative on said processor to select an image for recommendation to a current user of said content hosting service, said engine comprising:

a seed object module to define a seed image as an image currently viewed or selected by said current user, to retrieve said properties associated with said seed image and to use said seed image to identify seed collections from among said collections of images of which said seed image is a member;

a candidate object module to select a plurality of candidate images from said identified seed collections as a function of at least one of: a coherence score of said identified seed collections and centrality scores of said seed images and said candidate images and to determine for each said candidate image, a significance score as a function of either: a number of seed collections of which said candidate image is a member, or, a ratio of said number of seed collections of which said candidate image is a member to a number of collections of images of which said candidate image is a member; and a ranker to rank each said candidate image based on said significance scores and on seed image properties and to recommend at least one said candidate image for recommendation to said current user via said client module based on said ranking of said candidate images.

8. The system of claim 7, wherein said coherence score and said centrality score are calculated as a function of at least one of: said images and said image properties.

9. The system of claim 8 wherein said image properties comprise at least one of: a category, a tag associated with said images, characteristics of said images, extrinsic properties of said images, intrinsic properties of said images, subjective properties of said images, and objective properties of said images.

* * * * *